(12) United States Patent
Fleisher

(10) Patent No.: US 7,145,026 B2
(45) Date of Patent: Dec. 5, 2006

(54) CONTINUOUS TRANSESTERIFICATION PROCESS

(75) Inventor: Christian A. Fleisher, Saratoga Springs, NY (US)

(73) Assignee: Biodiesel Technologies, Inc., Saratoga Springs, NY (US)

( * ) Notice: Subject to any disclaimer, the term of this patent is extended or adjusted under 35 U.S.C. 154(b) by 390 days.

(21) Appl. No.: 10/411,664

(22) Filed: Apr. 11, 2003

(65) Prior Publication Data
US 2003/0229238 A1 Dec. 11, 2003

Related U.S. Application Data

(60) Provisional application No. 60/372,072, filed on Apr. 12, 2002.

(51) Int. Cl.
*C11B 3/00* (2006.01)

(52) U.S. Cl. .................................... 554/184; 554/169
(58) Field of Classification Search ................ 554/184, 554/169
See application file for complete search history.

(56) References Cited

U.S. PATENT DOCUMENTS 5,844,111 A * 12/1998 Granberg et al. ........... 554/184
2002/0035282 A1* 3/2002 Suppes ....................... 554/124

FOREIGN PATENT DOCUMENTS

WO    WO 03/087279    10/2003

* cited by examiner

*Primary Examiner*—Deborah D. Carr
(74) *Attorney, Agent, or Firm*—Michael W. Ferrell

(57) ABSTRACT

A process for converting at least one triglyceride feedstock to at least one fatty-acid methyl ester product is disclosed. The process includes a continuous, plug-flow environment with a single-pass residence time as low as about 10 seconds, and a conversion of at least 70 percent.

20 Claims, 4 Drawing Sheets

CONTINUOUS TRANSESTERIFICATION PROCESS

RELATED APPLICATIONS

This disclosure is a continuation of a Provisional Patent Application. No. 60/372,072, filed Apr. 12, 2002, the entire disclosure of which is incorporated herein by specific reference.

TECHNICAL FIELD

Embodiments relate to a process for the continuous, plug-flow transesterification of a plant-based oil. More particularly, embodiments relate to the transesterification of triglycerides to diesel fuel grade methyl esters. In particular, a continuous, plug-flow reaction environment is used without a phase stabilizer to transesterifiy triglycerides to their corresponding methyl esters.

BACKGROUND INFORMATION

The bio-diesel process converts fats and oils into diesel. This process includes two reactions in which the feedstock is esterified with methanol to form methyl esters of 16 to 18 carbons in length. The feedstock can include free fatty acids and triglycerides with small amounts of impurities. The purified methyl esters can be used as diesel fuel. Glycerol is formed as a byproduct of this process.

One technique for transesterification of FFAs and triglycerides includes a batch process. The batch process includes a two-phase liquid reaction. The two-phase liquid reaction results in long residence times and low yields. Consequently, batch reactors need to be run at high impeller intensity, high temperature, and high pressure to obtain reasonable reaction rates and yields.

Under atmospheric conditions, the transesterification reaction can require many hours to proceed. A co-solvent such as tetrahydrofuran (THF) can be added to the system to substantially reduce the reaction time by changing the two-phase liquid system into a single-phase liquid.

Other problems for bio-diesel production have a variety of, such as long fluid hold up times, energy intensive separations, and safety concerns over the use of co-solvents.

What is needed is a transesterification process that avoids at least some of the problems of the prior art.

TECHNICAL SUMMARY

A process is disclosed that operates to convert at least one triglyceride to at least one fatty acid methyl ester in a plug-flow environment. The process can be accomplished in one embodiment by operating in a temperature range from about 80° C. to about 180° C. The process can also be accomplished in one embodiment by operating in a plug-flow residence time of less than three minutes. The process can also be accomplished in one embodiment by operating in a pressure environment of about 30 atmospheres or less. The process limitations result in a conversion of the triglycerides to fatty acid methyl esters in a range from about 70 percent to in excess of about 99 percent.

The process can also include phase separation of the fatty acid methyl esters from unreacted triglycerides and byproducts. The phase separation process refines the fatty acid methyl esters to a diesel fuel grade product.

BRIEF DESCRIPTION OF THE DRAWINGS

In order to understand the manner in which embodiments are obtained, a more particular description of various embodiments briefly described above will be rendered by reference to the appended drawings. Understanding that these drawings depict only typical embodiments that are not necessarily drawn to scale and are not therefore to be considered to be limiting of its scope, the embodiments will be described and explained with additional specificity and detail through the use of the accompanying drawings in which.

DETAILED DESCRIPTION

Figure 1:
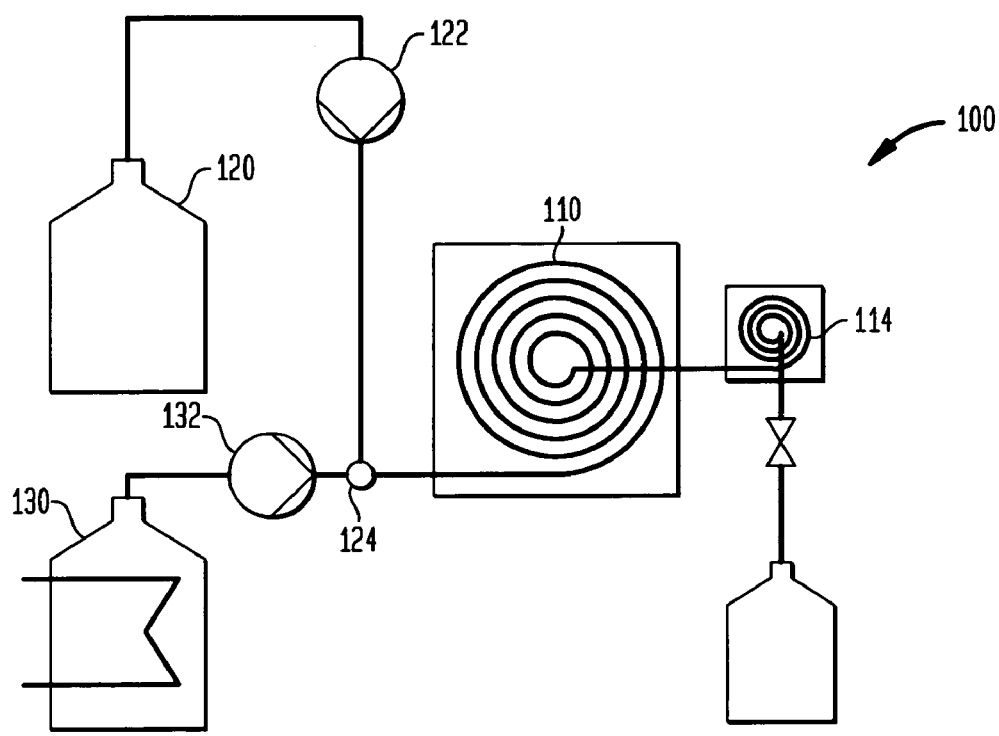
FIG. 1 is a schematic of a process according to an embodiment.

The following description includes terms, such as upper, lower, first, second, etc. that are used for descriptive purposes only and are not to be construed as limiting. Reference will now be made to the drawings wherein like processes will be provided with like reference designations. In order to show the process elements of embodiments most clearly, the drawings included herein are diagrammatic representations of various embodiments. Thus, the actual appearance of the processes may appear different while still incorporating the essential processes of embodiments. Moreover, the drawings show only the processes necessary to understand the embodiments. Additional processes known in the art have not been included to maintain the clarity of the drawings.

A process is disclosed that operates to convert at least one triglyceride to at least one fatty acid methyl ester in a plug-flow environment. The process can be accomplished in one embodiment by operating in a temperature range from about 80° C. to about 180° C. The process can also be accomplished in one embodiment by operating in a plug-flow residence time of less than three minutes. The process can also be accomplished in one embodiment by operating in a pressure environment of about 30 atmospheres or less. The process limitations result in a conversion of the triglycerides to fatty acid methyl esters in a range from about 70 percent to in excess of about 99 percent.

The process can also include phase separation of the fatty acid methyl esters from unreacted triglycerides and byproducts. The phase separation process refines the fatty acid methyl esters to a diesel fuel grade product.

Various plant oils can be used according to process embodiments. In one embodiment, a plant oil is used that is selected from corn oil, linseed oil, rape seed oil, combinations thereof, and the like. In one embodiment, a plant oil is used that is selected from olive oil, palm kernel oil, coconut oil, combinations thereof, and the like. In one embodiment, a plant oil is used that is selected from soybean oil, cottonseed oil, peanut oil, safflower oil, castor bean oil, combinations thereof, and the like.

Other oil embodiments include oils that have a plurality of saturated C4–C14 contents such as coconut oil and the like. Other oil embodiments include oils that have a plurality of saturated and unsaturated C16–C18 contents such as cottonseed oil and the like. Other oil embodiments include oils that have a majority of unsaturated C18 contents such as linseed oil and the like.

Various catalysts can be used according to process embodiments. In one embodiment, a liquid-phase caustic is used. In one embodiment, a caustic such as NaOH, KOH, LiOH, and combinations thereof is used. In one embodiment, KOH is used and the potassium in the KOH provides a useful element in the byproduct glycerol if it is used as a fertilizer or other application.

In one embodiment, an insoluble catalyst is used. In this embodiment, a metallic compound is used. In one embodiment, the metallic compound can be embedded upon the inner surfaces of the plug-flow reactor such that the reactants are forced across the inner surfaces under high shear. In one embodiment where the plug-flow reactor includes a static mixing element such as packing and/or baffles, the metallic compound catalyst can be imbedded upon the surfaces of the packing material.

In one embodiment, the metallic compound is selected from tin, lead, and combinations thereof. In one embodiment, the metallic compound is selected from mercury, cadmium, zinc, and combinations thereof. In one embodiment, the metallic compound is selected from titanium, zirconium, hafnium, and combinations thereof. In one embodiment, the metallic compound is selected from boron, aluminum, and combinations thereof. In one embodiment, the metallic compound is selected from phosphorus, arsenic, antimony, bismuth, and combinations thereof. In one embodiment, the metallic compound is selected from calcium, magnesium, strontium, and combinations thereof. In one embodiment, the metallic compound is selected from potassium, sodium, lithium, and combinations thereof. In one embodiment, the metallic compound is uranium.

In one embodiment, the catalyst is a combination of a caustic soluble catalyst and an insoluble catalyst.

FIG. 1 is a schematic of a process 100 according to an embodiment. A plug-flow reactor 110 including about 7 foot of ⅜ inch coiled copper pipe is provided. Reactant materials 120 include a mixture of methanol (MeOH) and a caustic catalyst including sodium hydroxide (NaOH). In one embodiment, the reactant materials include from about 2 to about 20 gram per liter (g/L) of NaOH in MeOH. In one embodiment, the reactant materials include from about 5 to about 10 g/L of NaOH in MeOH. In one embodiment, the reactant materials include about 7.5 g/L of KOH in MeOH.

The reactant materials 120 are advanced toward the plug-flow reactor 110 with a first pump 122. The first pump 122 is capable of achieving a pressure in a range from about 1 atmosphere (atm) to about 30 atm. In one embodiment, the limit pump 122 can operate against a pressure of about 15 atm.

A triglyceride feedstock 130 is provided to mix with the reactant materials 120. The triglyceride feedstock 130 is advanced toward the plug-flow reactor 110 with a second pump 132. The second pump 132 can operate against a pressure in a range from about 1 atm to about 30 atm. In one embodiment, the second pump 132 can operate against a pressure of about 15 atm.

The reactant materials 120 and the triglyceride feedstock 130 are mixed at a tee 124 before entering the plug-flow reactor 110. By controlling the flow rates with the first and second pumps 122 and 132, respectively, a residence time and a reaction pressure can be achieved according to various embodiments.

Example embodiments include bath temperatures for the plug-flow reactor 110 of about 50° C., about 60° C., about 65° C., about 73° C., about 80° C., and about 87° has occurred in the plug-flow reactor 110, a quench 114 accepts the product stream from the plug-flow reactor 110 to condense reaction products for analysis. The reaction products, as condensed form a two-phase composition. After quenching the products, analysis of the two phases indicated the NaOH remains in the aqueous phase, along with glycerol as a byproduct as well as unreacted methanol. Table 1 is a representation of various processes according to several embodiments.

TABLE 1

Conversion of Triglycerides to Methyl Esters

| Example No. | Residence time, s | Temperature, ° C. | Conversion, percent |
|---|---|---|---|
| 1 | 9 | 65 | 43 |
| 2 | 9 | 86.8 | 78 |
| 3 | 11.5 | 65 | 48 |
| 4 | 11.5 | 80.1 | 73 |
| 5 | 11.5 | 87.3 | 80 |
| 6 | 16 | 65 | 57 |
| 7 | 16 | 73 | 67 |
| 8 | 16 | 79.7 | 74 |

Figure 2:
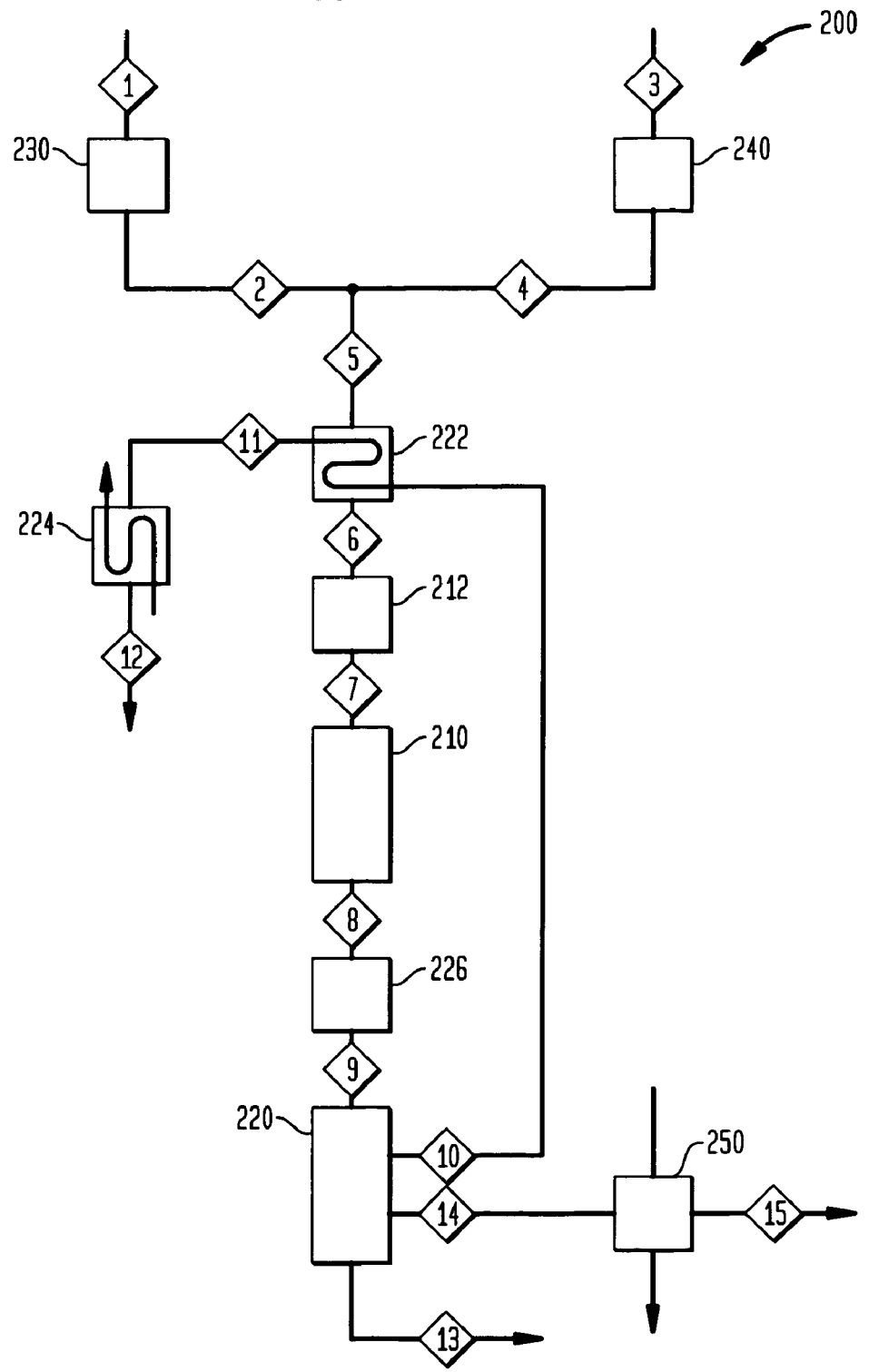
FIG. 2 is a schematic of a process according to an embodiment.

FIG. 2 is a schematic of a process 200 according to an embodiment. Various unit operations can be combined for a given process embodiment. Additionally, various streams are depicted according to an embodiment. A first reactant materials stream 1 is pumped to form a second reactant materials stream 2. A first triglyceride feedstock stream 3 is pumped to form a second triglyceride feedstock stream 4. Streams 2 and 4 form a first supply stream 5 that in turn can be temperature manipulated to a second supply stream 6. The second supply stream 6 can be further temperature manipulated to a third supply stream 7. Thereafter, a first product stream 8 can be temperature manipulated to a second product stream 9.

In a three-phase separation process, a first light key stream 10 is formed, along with a heavy key organic phase stream 14 and a heavy key aqueous phase stream 13. The first light key stream 10 can be temperature manipulated to a second light key stream 11. The second light key stream 11 can be further temperature manipulated to a third light key stream 12. Finally, the heavy key organic phase stream 14 can be water washed to form a washed organic phase stream 15.

Two significant unit operations include a reactor and a phase separator. A plug-flow reactor 210 is combined with a separation process 220. The plug-flow reactor 210 is supplied from a reactant materials source 230 and a triglyceride feedstock source 240. Product can be water washed at a washing process 250.

In one embodiment, the process of converting is facilitated by including a static mixing effect in the plug-flow reactor 210. In one embodiment, a tube reactor is provided, which is filled with packing material. The packing material causes the reactants to follow a turbulent, tortuous flow path. Examples of packing material include Pall rings, Rasching rings, Beryl saddles, inert spheres, and the like.

In one embodiment, the turbulent, continuous, plug-flow environment includes at least one baffle to assist in establishing a turbulent flow regime. In one embodiment, the plug-flow reactor 210 is configured to create a turbulent flow regime in a fluidized bed. In this embodiment, fluidizing packing material is used. In one embodiment, a solid catalyst is used as the fluidized packing material. In one embodiment, the solid catalyst is embedded upon the surfaces of the packing material. In one embodiment, the solid catalyst is embedded upon the inner surface of the plug-flow reactor 210. In either of these embodiments, the solid catalyst can be referred to as an insoluble catalyst.

In one embodiment the continuous, plug-flow environment includes a coiled tube that operates upon high shear and optionally high overpressure to force a quasi single-phase system to facilitate a higher reaction rate. In the coiled-tube plug-flow reactor environment, a residence time of less than about three minutes is sufficient to achieve at least 70 percent conversion. In one embodiment, the residence time is as short as about 9 seconds and a conversion in excess of 70 percent is accomplished. In one embodiment, a residence time of about 15 seconds is used and a conversion of greater than about 95 percent is achieved.

In one embodiment, the reactant materials source 230 and the triglyceride feedstock source 240 each include pumping capabilities to achieve pressures between ambient pressure and up to and/or in excess of about 30 atmospheres according to a specific application. In one embodiment, the process 200 operates at a pressure of about 20 atmospheres or lower and the pumping capabilities of the reactant materials source 230 and the triglyceride feedstock source 240 are used to supply reactants into a pressurized plug-flow reactor 210.

In operating environments that are at the lower temperature range herein disclosed, an overpressure can be imposed upon the reactants and products by use of the pumps that are part of the reactant materials source 230 and a triglyceride feedstock source 240. In one embodiment, the overpressure is used to achieve a high shear within the plug-flow reactor 210. The high shear tends to emulsify the triglycerides and the alcohol in the front region of the plug-flow reactor 210. Another effect of the overpressure is the vapor-suppressing effect upon the alcohol. By suppressing the alcohol from vaporizing, it remains more available to facilitate the transesterification reaction. In one embodiment, an overpressure of about 20 atm is used with a temperature range from about ambient to about 180° C. In one embodiment, an overpressure of about 10 atm is used with a temperature range from about ambient to about 180° C. In one embodiment, an overpressure of about 5 atm is used with a temperature range from about ambient to about 180° C. In one embodiment, an overpressure of about 1 atm is used with a temperature range from about ambient to about 180° C.

In one embodiment, the triglyceride feedstock source 240 includes a warming chamber and a pump. A first feedline (stream 4) couples the triglyceride feedstock source 240 to the reactor 210. A second feedline (stream 2) couples the reactant materials source 230 to the reactor 210. In one embodiment, the first feedline 4 and the second feedline 2 merge to form the first supply stream 5 as depicted in FIG. 2. Where the first supply stream 5 is formed, mixing of the triglyceride feedstock and the alcohol can occur. Where the catalyst is a liquid-phase caustic, the catalyst also mixes in the first supply stream 5.

The plug-flow reactor 210 is supported by various other unit operations. A booster heater 212 acts to manipulate the second reactant stream 6 to the third reactant stream 7. Accordingly, a given feed temperature and pressure for the third reactant stream 7 are achieved as the third reactant stream 7 enters the plug-flow reactor 210.

The separation process 220 is supported by various other unit operations. In one embodiment prior to products in the first product stream 8 entering the separation process 220, a booster heater 226 is used to achieve the second product stream 9. Where the separation process 220 is a flash unit operation, the booster heater 226 can impart a sufficient temperature to the first product stream 8 to cause the second product stream 9 to achieve a given separation between light and heavy keys.

Other temperature manipulation of the first light key stream 10 can include an economizer 222, which can be a preheater to the first reactant stream 5, while it cools the first light key stream 10 to the second light key stream 11. Additionally, the second light key stream 11 can be further cooled at a light key stream cooler 224 to form the third light key stream 12.

In one embodiment where the organic phase stream 14 contains entrained aqueous-type components, it can be water washed at the washing process 250 to form a final organic phase stream 15 that is an improved grade of diesel fuel methyl esters with little or no alcohol in solution.

EXAMPLE 8

Reference is again made to FIG. 2. A 7.5 g/L solution of NaOH in MeOH is supplied at a rate of 20.7 lb/min at the first reactant material stream 1. In addition to the NaOH in MeOH, about 170 lb/min of a triglyceride stream of soybean oil is pre-warmed to about 40° C. in the first triglyceride feedstock stream 3.

The products exiting the plug-flow reactor 210 in the first product stream 8, include about 1.7 lb/min untreated triglycerides, about 169 lb/min methyl esters, about 18.4 lb/min glycerol byproduct, and about 1.7 lb/min NaOH catalyst.

EXAMPLE 9

Reference is made to FIG. 2. In Example 9, Table 2 is a stream table, which depicts processing conditions and results.

TABLE 2

| Processing Conditions for Conversion of Triglycerides to Methyl Esters | | | | | | | | |
|---|---|---|---|---|---|---|---|---|
| Stream No. | 1 | 2 | 3 | 4 | 5 | 6 | 7 | 8 |
| T, ° F. | 70 | 70 | 70 | 70 | 65 | 100 | 302 | 314 |
| P, psia | 25 | 230 | 25 | 250 | 250 | 250 | 250 | 240 |
| M, lb/hr | 2,400 | 2,400 | 10,200 | 10,200 | 12,600 | 12,600 | 12,600 | 12,600 |
| Wt., pct | | | | | | | | |
| Triglycerides | | | 100 | 100 | 80.93 | 80.93 | 80.93 | 0.4 |
| MeEsters | | | | | | | | 80.9 |
| MeOH | 95.75 | 95.75 | | | 18.26 | 18.26 | 18.26 | 9.57 |
| NaOH | 4.25 | 4.25 | | | 0.81 | 0.81 | 0.81 | 0.81 |
| Glycerol | | | | | | | | 8.32 |

TABLE 2-continued

Processing Conditions for Conversion of Triglycerides to Methyl Esters

| Stream No. | 9 | 10 | 11 | 12 | 13 | 14 | 15 |
|---|---|---|---|---|---|---|---|
| T, °F. | 356 | 355 | 320 | 122 | 355 | 355 | n/a |
| P, psia | 240 | 29 | 29 | 29 | 29 | 29 | n/a |
| M, lb/hr | 12,600 | 1,460 | 1,460 | 1,460 | 950 | 10,200 | n/a |
| Wt., pct | | | | | | | |
| Triglycerides | 0.4 | 3.49 | 3.49 | 3.49 | | 0.27 | |
| MeEsters | 80.9 | 0.45 | 0.45 | 0.45 | | 99.7 | |
| MeOH | 9.57 | 80.57 | 80.57 | 80.57 | 2.32 | | |
| NaOH | 0.81 | | | | 8.26 | | |
| Glycerol | 8.32 | 8.55 | 8.55 | 8.55 | 89.4 | | |

In one embodiment, processing conditions for Example 9 include a tube as the plug-flow reactor 210. The tube is a packed pipe with an inner diameter of about 6 inch and a length in a range from about 10 foot to about 30 foot. In one embodiment, the tube is about 14 foot and the residence time is about 45 seconds. In one embodiment the tube is about 25 foot. In one embodiment, the tube is about 14 foot and conversion of the triglyceride feedstock in stream 4 exceeds about 99.9 percent according to processing conditions of the tube being a packed pipe with an inner diameter of about 6.

With reference to FIG. 2, other embodiments are disclosed. Converting is carried out in a continuous, plug-flow environment such a the plug-flow reactor 210. The plug-flow environment includes a temperature range from about 80° C. to about 180° C. The reactant materials pump 230 and the triglyceride feedstock pump 240 charge the plug-flow reactor 210 under conditions to cause a turbulent flow regime in the plug-flow reactor 210.

Table 3 represents other example embodiments. In examples 10–19, a 6-inch diameter, 10-foot length packed plug-flow reactor is used. In examples 20–30, a 0.5-inch diameter, 30-foot length coiled copper tube plug-flow reactor is used. Additionally in examples 20–30, about 2 atm overpressure is imposed upon the reactants and products.

TABLE 3

Plug-Flow Process Examples

| Ex. | Triglyceride | Catalyst | T, °C. | P, atm | Residence Time, sec | Conversion, pct |
|---|---|---|---|---|---|---|
| 10 | olive oil | NaOH | 80 | 2 | 15 | >70 |
| 11 | corn oil | KOH | 90 | 3 | 15 | >75 |
| 12 | linseed oil | LiOH | 100 | 4 | 15 | >80 |
| 13 | rapeseed | NaOH | 110 | 5 | 15 | >85 |
| 14 | palm oil | KOH | 120 | 7 | 15 | >90 |
| 15 | coconut oil | NaOH | 130 | 9 | 35 | >90 |
| 16 | soybean oil | NaOH | 140 | 11 | 15 | >90 |
| 17 | cotton seed oil | KOH | 150 | 14.5 | 15 | >90 |
| 18 | peanut oil | LiOH | 160 | 18 | 15 | >95 |
| 19 | safflower oil | NaOH | 170 | 22 | 15 | >95 |
| 20 | castor oil | KOH | 180 | 27 | 15 | >95 |
| 21 | olive oil | LiOH | 80 | 4 | 45 | >99 |
| 22 | corn oil | NaOH | 90 | 5 | 45 | >99 |
| 23 | linseed oil | NaOH | 100 | 6 | 45 | >99 |
| 24 | rapeseed | KOH | 110 | 7 | 45 | >99 |
| 25 | palm oil | NaOH | 120 | 9 | 45 | >99 |
| 26 | coconut oil | NaOH | 130 | 11 | 45 | >99 |
| 27 | soybean oil | KOH | 140 | 13 | 45 | >90 |
| 28 | cotton seed oil | LiOH | 150 | 16 | 45 | >90 |
| 29 | peanut oil | NaOH | 160 | 20 | 45 | >95 |
| 30 | safflower oil | KOH | 170 | 24 | 45 | >95 |
| 31 | castor oil | LiOH | 180 | 29 | 45 | >95 |

Processing the triglycerides can be done at the lower end of the disclosed temperature range to achieve a conversion of greater than or equal to about 70 percent in a single pass through the plug-flow reactor 210. In one embodiment, however conversion of up to 99 percent is achieved in a single pass through the plug-flow reactor 210 by increasing the overpressure from about 2 atm to about 15 atm. In another embodiment, conversion of about 99 percent is achieved in a single pass through the plug-flow reactor by increasing the residence time. In another embodiment, conversion greater than 70 percent is achieved by forming a recycle stream of at least the unreacted triglycerides.

Figure 3:
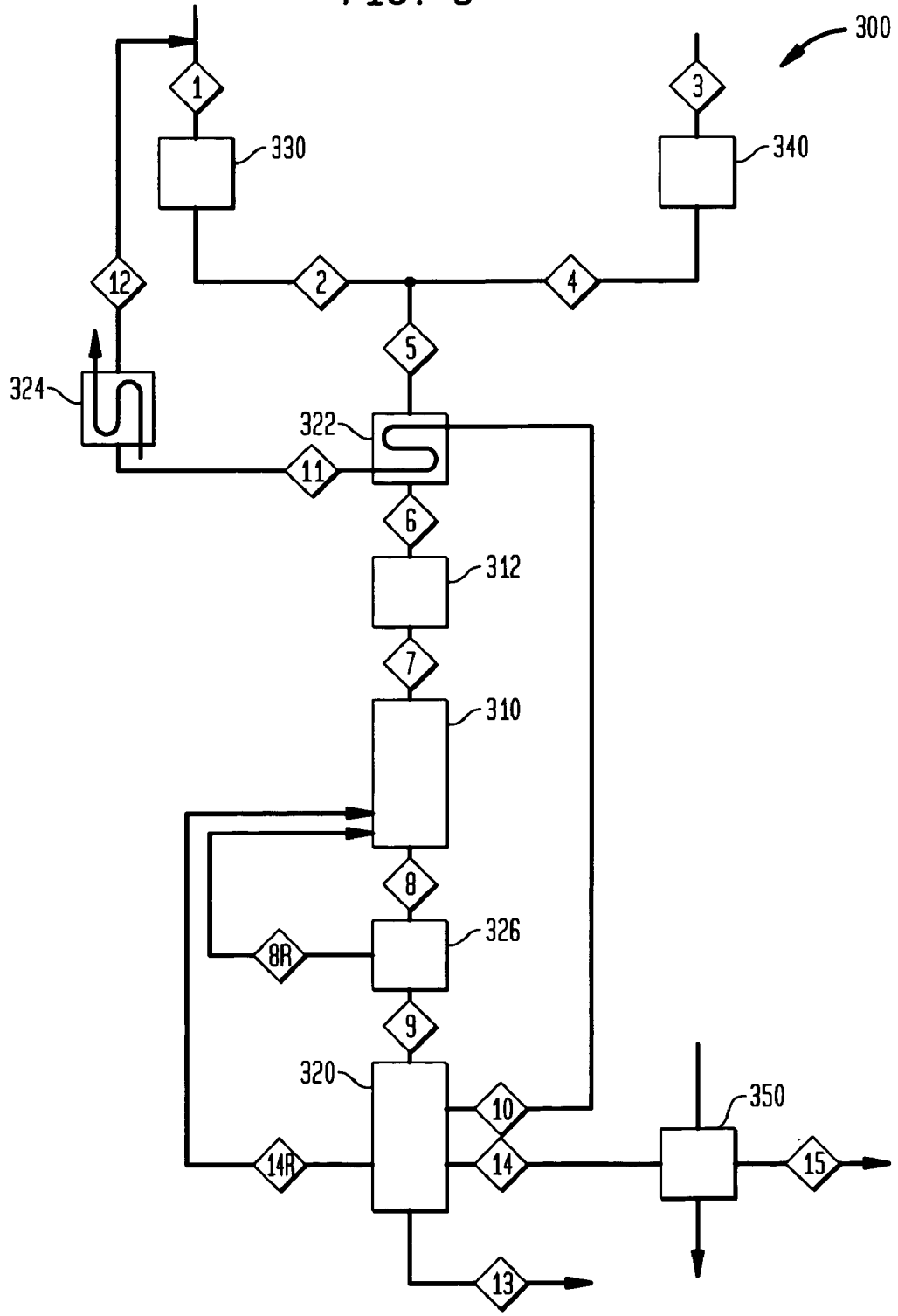
FIG. 3 is a schematic of a recycle process according to an embodiment.

FIG. 3 is a schematic of a recycle process 300 according to an embodiment. Various unit operations can be combined for a given process embodiment. Additionally, various streams are depicted according to an embodiment. A first reactant materials stream 1 is pumped to form a second reactant materials stream 2. A first triglyceride feedstock stream 3 is pumped to form a second triglyceride feedstock stream 4. Streams 2 and 4 form a first supply stream 5 that in turn can be temperature manipulated to a second supply stream 6. The second supply stream 6 can be further temperature manipulated to a third supply stream 7. Thereafter, a first product stream 8 can be temperature manipulated to a second product stream 9. Additionally, a first product recycle stream 8R is recycled to a reaction section of the recycle process 300.

In a three-phase separation process, a first light key stream 10 is formed, along with a heavy key organic phase stream 14 and a heavy key aqueous phase stream 13. The first light key stream 10 can be temperature manipulated to a second light key stream 11. The second light key stream 11 can be further temperature manipulated to a third light key stream 12. The heavy key organic phase stream 14 can be split to form a heavy key organic phase recycle stream 14R. The heavy key organic phase recycle stream 14R is recycled to a reaction section of the recycle process 300. Finally, the heavy key organic phase stream 14 can be water washed to form a washed organic phase stream 15.

Two significant unit operations include a recycle reactor and a phase separator, each with recycle capabilities. A plug-flow recycle reactor 310 is combined with a separation process 320. The plug-flow recycle reactor 310 is supplied from a reactant materials source 330, a triglyceride feedstock source 340, and at least one of the first product recycle stream 8R and the heavy key organic phase recycle stream 14R. Methyl ester product can be water washed at a washing process 350.

In one embodiment, at least one of the reactant materials source 330, the triglyceride feedstock source 340, the first product recycle stream 8R, and the heavy key organic phase recycle stream 14R includes pumping capabilities to achieve pressures and/or overpressures between ambient and up to or in excess of about 30 atmospheres according to a specific application. In one embodiment, the recycle process 300 operates at a pressure of about 20 atmospheres or lower and the enumerated pumping capabilities are used to supply reactants into a pressurized plug-flow recycle reactor 310.

In one embodiment, the triglyceride feedstock source 340 includes a warming chamber and a pump. A first feedline (stream 4) couples the triglyceride feedstock source 340 to the plug flow recycle reactor 310. A second feedline (stream 2) couples the reactant materials source 330 to the plug-flow recycle reactor 310. In one embodiment, the first feedline 4 and the second feedline 2 merge to form the first supply stream 5 as depicted in FIG. 3. Where the first supply stream 5 is formed, mixing of the triglyceride feedstock and the alcohol can occur. Where the catalyst is a liquid-phase caustic, the catalyst also mixes in the first supply stream 5.

The plug-flow recycle reactor 310 is supported by various other unit operations. A booster heater 312 acts to manipulate the second reactant stream 6 to the third reactant stream 7. Accordingly, a given feed temperature and pressure for the third reactant stream 7 are achieved as the third reactant stream 7 enters the plug-flow recycle reactor 310.

The separation process 320 is supported by various other unit operations. In one embodiment prior to products in the first product stream 8 entering the separation process 320, a booster heater 326 is used to achieve the second product stream 9. Where the separation process 320 is a flash unit operation, the booster heater 326 can impart a sufficient temperature to the first product stream 8 to cause the second product stream 9 to achieve a given separation between light and heavy keys.

Other temperature manipulation of the first light key stream 10 can include an economizer 322, which can be a preheater to the first reactant stream 5, while it cools the first light key stream 10 to the second light key stream 11. Additionally, the second light key stream 11 can be further cooled at a light key stream cooler 324 to form the third light key stream 12.

In one embodiment where the organic phase stream 14 contains entrained aqueous-type components, it can be water washed at the washing process 350 to form a final organic phase stream 15.

As illustrated, FIG. 3 depicts various recycle processes. In one embodiment, a heavy key organic phase recycle stream 14R returns unreacted triglycerides, along with diesel fuel-grade methyl esters, to the plug-flow recycle reactor 310. For the heavy key organic phase recycle stream 14R, the precise location of entry along the length of the plug-flow recycle reactor 310 is depicted in at an arbitrary entry point. In one embodiment, the location of entry is at a point of approximate chemical equilibrium within the plug-flow recycle reactor 310 for the unreacted triglycerides and methyl esters in stream 14R. In one embodiment, the location of entry is at a point where the unreacted triglycerides imposes a chemical potential of reacting to form methyl esters therefrom. In one embodiment, the location of entry is at a point where the unreacted triglycerides are in excess of the quasi-equilibrium within the plug-flow recycle reactor 310.

FIG. 3 also depicts recycle of a first product recycle stream 8R, which includes aqueous, organic, and caustic catalyst if present. For the first product recycle stream 8R the precise location of entry along the length of the plug-flow recycle reactor 310 is depicted in at an arbitrary entry point. In one embodiment, the location of entry is at a point of approximate chemical equilibrium within the plug-flow recycle reactor 310 for the unreacted triglycerides and methyl esters in stream 8R. In one embodiment, the location of entry is at a point where the unreacted triglycerides imposes a chemical potential of reacting to form methyl esters. In one embodiment, the location of entry is at a point where the unreacted triglycerides are in excess of the quasi-equilibrium within the plug-flow recycle reactor 310.

After reacting the triglycerides, a separation of the methyl esters from other stream constituents is carried out according to an embodiment. Reference is again made to FIG. 2, although separation processing is applicable to the process depicted in FIG. 3. In one embodiment, the separation process 220 includes a three-phase separation that is a flash process and an aqueous-organic settling process. In the flash process, the light key includes mostly alcohol such as MeOH according to an embodiment. Some glycerol byproduct also flashes as part of the light key under selected processing conditions. From Example 9, about 12 percent of the glycerol that is produced is entrained in the first light key stream 10. In one embodiment, the booster healer 226 is provided to manipulate the temperature of the first product stream 8 in preparation for the flash separation, in order to achieve above 97 percent separation of alcohol into the first light key stream 10. In Example 9, about 97.6 percent of the MeOH separates from the second product stream 9 in the separation process 220. In this embodiment, the MeOH flashes out of the second product stream 9, and the methyl esters separate from the glycerol to form the respective heavy key organic phase stream 14 and the heavy key aqueous phase stream 13. According to the processing conditions set forth in Example 9, the heavy key organic phase stream 14 is a diesel fuel grade methyl ester.

Other processing conditions can be imposed upon the separation process 220 to achieve a given minimum alcohol content in the heavy key aqueous phase stream 14. In one embodiment, the separation process 220 is carried out at a temperature to include no more than about 5 percent methanol. In one embodiment, the separation process 220 is carried out at a temperature to include no more than about 1 percent methanol.

In one embodiment, however, where the presence of entrained alcohol is not needed, a washing process 250 is carried out with a water wash, to remove alcohol in the heavy key organic phase stream 14.

Figure 4:
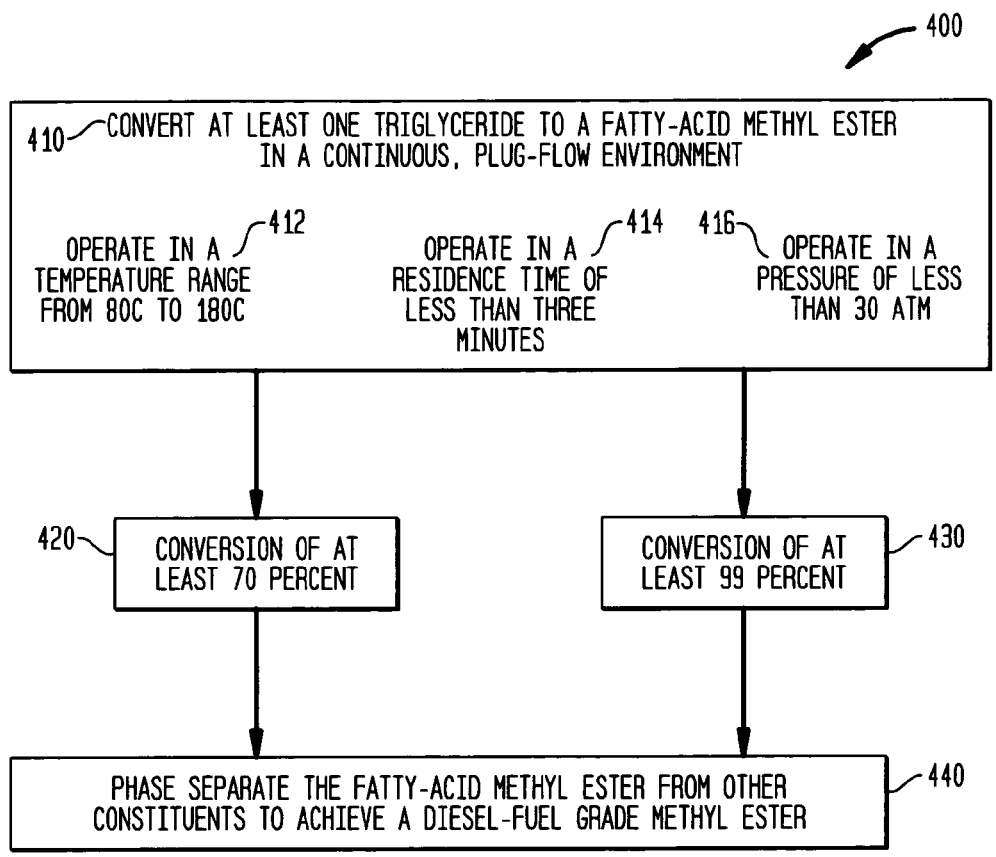
FIG. 4 is a process flow diagram according various embodiments.

FIG. 4 is a process flow diagram 400 according to various embodiments. At 410, the process operates to convert at least one triglyceride to at least one fatty acid methyl ester in a plug-flow environment. The process at 410 is accomplished in combination with any one of the process conditions set forth at 412, 414, and 416.

At 412, the process is accomplished by operating in a temperature range from about 80° C. to about 180° C. The process limitations at 410 and 412 can be combined to achieve either process result of at least 70 percent conversion at 420, or at least 99 percent conversion at 430.

At 414, the process is accomplished by operating in a plug-flow residence time of less than three minutes. The process limitations at 410 and 414 can be combined to achieve either process result of at least 70 percent conversion at 420, or at least 99 percent conversion at 430.

At 416, the process is accomplished by operating in a pressure environment of about 30 atm or less. The process limitations at 410 and 416 can be combined to achieve either process result of at least 70 percent conversion at 420, or at least 99 percent conversion at 430.

Another embodiment includes a system. The system includes reactants, products, and processing equipment as set forth in this disclosure.

It can now be appreciated that the process phase of converting at 410 can be combined with at least two of the process phases of temperature limitations at 412, residence time limitations at 414, and pressure limitations at 416.

At 440, the process can add the embodiment of phase separating the fatty-acid methyl ester to achieve a diesel-fuel grade methyl ester.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

It will be readily understood to those skilled in the art that various other changes in the details, material, and arrangements of the port and method stages which have been described and illustrated in order to explain the nature of this invention may be made without departing from the principles and scope of the invention as expressed in the subjoined claims.

The invention claimed is:

1. A process for producing fatty-acid methyl esters comprising:
reacting at least one triglyceride feedstock with alcohol, wherein the reaction is carried out in a continuous, plug-flow environment, wherein the plug-flow environment includes temperature range from about 80° C. to about 180° C. and residence time of less than about 3 minutes.

2. The process according to claim 1, wherein the plug-flow environment includes a static mixing effect.

3. The process according to claim 1, wherein the plug-flow environment includes a static mixing element selected from the group consisting of at least one baffle, packing material, fluidized packing material, and combinations thereof.

4. The process according to claim 1, wherein the reaction is carried out in the presence of a caustic catalyst.

5. The process according to claim 1, wherein the reaction achieves a conversion of the at least one triglyceride feedstock at greater than or equal to about 70 percent.

6. The process according to claim 1 further including: separating the produced fatty-acid methyl esters under conditions to achieve a diesel fuel grade methyl esters.

7. The process according to claim 1 further including: temperature manipulating the produced fatty-acid methyl esters; and flash separating the fatty-acid methyl esters under conditions to achieve diesel fuel grade methyl esters, wherein flash separating is carried out at a temperature that achieves a flash separation of an alcohol between a light key and a heavy key, of more than about 97 percent in the light key.

8. A process for producing fatty-acid methyl esters comprising:
reacting at least one triglyceride feedstock with alcohol, wherein the reaction is carried out in a continuous, plug-flow environment, wherein the plug-flow environment includes a pressure between about 1 atmosphere and about 20 atmospheres, and wherein the process achieves a conversion of the trigylceride feedstock of greater than about 99 percent.

9. The process according to claim 8, wherein the pressure is above about 10 atmospheres, wherein the temperature is above about 100° C., and wherein the alcohol is suppressed from vaporizing.

10. The process according to claim 8, wherein the reaction is carried out in the presence of a catalyst selected from the group consisting of NaOH, KOH, LiOH, an insoluble metal, and combinations thereof.

11. The process according to claim 8, wherein the pressure is above about 10 atmospheres, wherein the temperature is above about 100° C., wherein the reaction is carried out in the presence of a catalyst, wherein the alcohol is suppressed from vaporizing, and wherein the catalyst is a liquid-phase caustic selected from the group consisting of NaOH, KOH, and LiOH, and combinations thereof.

12. A process for producing fatty-acid methyl esters comprising:
reacting at least one triglyceride feedstock with alcohol, wherein the reaction is carried out in a continuous, plug-flow environment, wherein the plug-flow environment includes a residence time of less than about 2 minutes, and wherein the process achieves a conversion of the triglyceride feedstock of greater than about 99 percent.

13. The process according to claim 12, wherein the residence time is less than or equal to about 0.75 minutes, and wherein the process achieves the conversion in a single-pass.

14. The process according to claim 12, wherein the reaction is carried out in the presence of a catalyst selected from the group consisting of NaOH, KOH, LiOH, an insoluble metal, and combinations thereof.

15. The process according to claim 12, wherein the residence time is less than or equal to about 0.75 minute, wherein the process achieves the conversion in a single-pass, and wherein the reaction is carried out in the presence of a catalyst, wherein the catalyst is selected from the group consisting of NaOH, KOH, LiOH, an insoluble metal, and combinations thereof.

16. A process for producing fatty-acid methyl ester comprising:
reacting at least one triglyceride feedstock with alcohol, wherein the reaction is carried out in a continuous, plug-flow environment, wherein the plug-flow environment includes a pressure between about 1 atmosphere and about 20 atmospheres, wherein the plug-flow environment includes a temperature range from about 80°

C. to about 180° C., and wherein the process achieves a conversion of the triglyceride feedstock of greater than about 99 percent.

17. The process according to claim 16, wherein the temperature is about 167° C.

18. The process according to claim 16, wherein the reaction is carried out in the presence of a catalyst, wherein the catalyst is selected from NaOH, KOH, LiOH, an insoluble metal, and combinations thereof.

19. The process according to claim 14, wherein the plug-flow environment includes a static mixing element.

20. The process according to claim 19, wherein the catalyst can be premixed with the alcohol, embedded in the plug-flow environment, and imbedded in the static mixing element.

* * * * *

UNITED STATES PATENT AND TRADEMARK OFFICE
Certificate

Patent No. 7,145,026 B2                  Patented: December 5, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Christian A. Fleisher, Saratoga Springs, NY (US); Alfred M. Center, Ithaca, NY (US); Andras Nady, Daphne, AL (US); Christian Wood, Philadelphia, PA (US); Eric Johnson, Columbus, OH (US).

Signed and Sealed this Eleventh Day of March 2008.

JEAN F. VOLLANO
*Quality Assurance Specialist*
Technology Center 1600